United States Patent

La Palm et al.

[11] Patent Number: 5,824,890
[45] Date of Patent: Oct. 20, 1998

[54] REAL TIME MISFIRE DETECTION FOR AUTOMOBILE ENGINES

[75] Inventors: James La Palm, Garden City; Piotr Czapski, Farmington Hills, both of Mich.

[73] Assignee: Chrysler Corporation, Auburn Hills, Mich.

[21] Appl. No.: 691,100

[22] Filed: Aug. 1, 1996

[51] Int. Cl.$^6$ .................................................. G01M 15/00
[52] U.S. Cl. ...................... 73/117.3; 73/116; 364/431.07; 123/419; 123/436
[58] Field of Search .................................. 73/116, 117.2, 73/117.3; 123/419, 425, 436; 364/431.07, 431.08

[56] References Cited

U.S. PATENT DOCUMENTS

| | | | |
|---|---|---|---|
| 3,908,366 | 9/1975 | Masaki | 60/277 |
| 4,179,922 | 12/1979 | Bouverie et al. | 73/116 |
| 4,186,701 | 2/1980 | Suzuki et al. | 123/119 A |
| 4,271,811 | 6/1981 | Suzuki et al. | 123/571 |
| 4,308,519 | 12/1981 | Garcea et al. | 60/277 |
| 4,461,257 | 7/1984 | Hosaka et al. | 123/419 |
| 4,488,528 | 12/1984 | Morikawa | 123/425 |
| 4,491,110 | 1/1985 | Bone et al. | 123/425 |
| 4,532,592 | 7/1985 | Citron et al. | 364/431.05 |
| 4,562,818 | 1/1986 | Kohama et al. | 364/431.08 |
| 4,606,224 | 8/1986 | Tedeschi et al. | 73/117.3 |
| 4,716,874 | 1/1988 | Hilliard et al. | 123/425 |
| 4,782,692 | 11/1988 | Peden et al. | 73/117.3 |
| 4,846,129 | 7/1989 | Noble | 123/425 |
| 4,862,093 | 8/1989 | Jiewertz | 123/425 |
| 4,886,029 | 12/1989 | Lill et al. | 73/117.3 |
| 4,928,228 | 5/1990 | Fujimoto et al. | 73/117.3 |
| 4,930,479 | 6/1990 | Osawa et al. | 123/436 |
| 4,930,481 | 6/1990 | Fujimoto et al. | 123/481 |
| 4,932,379 | 6/1990 | Tang et al. | 123/436 |
| 4,936,277 | 6/1990 | Deutsch et al. | 123/436 |
| 4,941,445 | 7/1990 | Deutsch | 123/414 |
| 4,976,241 | 12/1990 | Ishida et al. | 123/425 |
| 4,987,711 | 1/1991 | Noji et al. | 52/167 DF |
| 4,987,771 | 1/1991 | Iwata | 73/117.3 |
| 5,021,960 | 6/1991 | Manaka et al. | 364/431.01 |
| 5,044,194 | 9/1991 | James et al. | 73/117.3 |
| 5,044,195 | 9/1991 | James et al. | 73/117.3 |
| 5,056,360 | 10/1991 | Dosdall et al. | 73/116 |
| 5,095,742 | 3/1992 | James et al. | 73/116 |
| 5,109,695 | 5/1992 | James et al. | 73/117.3 |
| 5,117,681 | 6/1992 | Dosdall et al. | 73/116 |
| 5,144,927 | 9/1992 | Denz | 123/425 |
| 5,200,899 | 4/1993 | Ribbens et al. | 364/431.08 |
| 5,231,869 | 8/1993 | Klenk et al. | 73/116 |
| 5,239,473 | 8/1993 | Ribbens et al. | 73/117.3 |
| 5,263,453 | 11/1993 | Wakahara et al. | 123/436 |
| 5,278,760 | 1/1994 | Ribbens et al. | 364/431.07 |
| 5,307,671 | 5/1994 | Akase | 73/117.3 |
| 5,357,790 | 10/1994 | Hosoya | 73/117.3 |
| 5,361,628 | 11/1994 | Marko et al. | 73/116 |
| 5,361,629 | 11/1994 | McCombie | 73/117.3 |

(List continued on next page.)

OTHER PUBLICATIONS

FIR Windowed Filter Design Program—Window, L.R. Rabiner and C. A. McGonegal ( pp. 5.2–1 through 5.2–19).

(List continued on next page.)

*Primary Examiner*—George M. Dombroske
*Attorney, Agent, or Firm*—Mark P. Calcaterra

[57] ABSTRACT

An apparatus and corresponding method for detecting misfires of a motor vehicle internal combustion engine. The apparatus includes a speed sensor for generating a signal. Also, the apparatus includes a filter means for filtering noise-related events from said signal corresponding to sensed engine speed to thereby produce a filtered output signal. In addition, a pressure sensor for measuring average manifold absolute pressure over a cylinder firing event to set a misfire threshold change in engine speed value is shown. A comparison means for comparing said filtered output signal with said threshold change in engine speed value to detect an engine misfire condition for said cylinder firing event is also included.

24 Claims, 5 Drawing Sheets

U.S. PATENT DOCUMENTS

| | | | |
|---|---|---|---|
| 5,379,634 | 1/1995 | Kuroda et al. | 123/419 |
| 5,381,689 | 1/1995 | Ishida | 73/116 |
| 5,387,253 | 2/1995 | Remboski, Jr. et al. | 73/117.3 |
| 5,392,641 | 2/1995 | McCombie | 73/117.3 |
| 5,515,720 | 5/1996 | Remboski, Jr. et al. | 73/116 |
| 5,544,521 | 8/1996 | McCombie | 73/117.3 |
| 5,574,217 | 11/1996 | McCombie | 73/116 |

OTHER PUBLICATIONS

Estimate of IC Engine Torque from Measurement of Crankshaft Angular Position, Girogio Rizzoni and Francis T. Connolly, Ohio State University ( SAE Paper No. 932410).

An On–Line Engine Roughness Measurement Technique, William P. Mihelc and Stephen J. Citron, School of Mechanical Engineering, Purdue University (SAE Paper No. 840136).

Cylinder by Cylinder Engine Pressure and Pressure Torque Waveform Determination Utilizing Speed Fluctuations, Stephen J. Citron, John E. O'Higgins, and Lillian Y. Chen, Engine Controls Lab, School of Mechanical Engineering, Purdue University, West Lafayette, Indiana (SAE Paper No. 890486).

Advanced Signal Processing for Misfire Detection in Automotive Engines, William B. Ribbens and Steven Bieser, ©1995 IEEE.

Analysis and Processing of Shaft Angular Velocity Signals in Rotating Machinery for Diagnostic Applications, Yong W. Kim. Giorgio Rizzoni, Bahman Samimy, Yue Y. Wang, ©1995 IEEE.

Detection of Partial Misfire in IC Engines Using a Measurement of Crankshaft Angular Velocity, Donghyeon Lee (Hyundai Motor Co.) and Giorgio Rizzoni (The Ohio State Univ.) (SAE Paper No. 951070).

Road Test of a Misfire Detection System, William B. Ribbens and Jaehong Park, University of Michigan (SAE Paper No. 940975).

A New Metric for Torque Nonuniformity, William B. Ribbens (SAE Paper No. 830425).

Applications of Precise Crankshaft Position Measurements for Engine Testing, Control and Diagnosis, W.B. Ribbens and G. Rizzoni (SAE Paper No. 890885).

A Mathematical Model Based Method for Diagnosing Failures in Automotive Electronic Systems, W.B. Rbbens (SAE Paper No. 910069).

Onboard Diagnosis of Engine Misfires, William B. Ribbens and Giorgio Rizzoni (SAE Paper No. 901768).

Estimate of Indicated Torque from Crankshaft Speed Fluctuations: A Model for the Dynamics of the IC Engine, Giorgio Rizzoni, IEEE Transactions on Vehicular Technology, vol. 38, No. 3, Aug. 1989 (©1990 IEEE).

Crankshaft Position Measurement with Applications to Ignition Timing, Diagnostics and Performance Measurement, Yibing Dong, Giorgio Rizzoni and William B. Ribbens–©1987 (SAE Paper No. 871914).

Fast Transforms for Rapid Isolation of Misfiring Cylinders, Giorgio Rizzoni ©1987 (SAE Paper No. 871915).

Torque Nonuniformity Measurements in Gasoline Fueled Passenger Cars Equipped with Automatic Transmission—Theory and Experimental Results, W.B. Ribbens and D. Gross (SAE Paper No. 860414).

A Non–Contacting Torque Sensor for the Internal Combustion Engine, W.B. Ribbens (SAE Paper No. 810155).

Experimental Road Test of a Noncontacting Method of Measuring I–C Engine Torque Nonuniformity, William B. Ribbens, ©1985 (SAE Paper No. 850454).

On–line Estimation of Indicated Torque in IC Engines Using Nonlinear Observers, Sergey Drankunov, Giorgio Rizzoni and Yue–Yan Wang, The Ohio State University (SAE Paper No. 950840).

Methods of On–Board Misfire Detection, Günther Plapp, Martin Klenk and Winfried Moser, Robert Bosch GmbH (SAE Paper No. 900232).

Misfire Detection by Evaluating Crankshaft Speed—A Means to Comply with OBDII, Martin Klenk and Winfried Moser (Robert Bosch GmbH) and Werner Mueller and Wolfgang Wimmer (Audi AG) (SAE Paper No. 930399).

Diagnosis of Individual Cylinder Misfires by Signature Analysis of Crankshaft Speed Fluctuations, G. Rizzoni, University of Michigan, ©1989 (SAE Paper No. 890884).

Measurement of Engine Misfire in the Lamborghini 533 V–12 Engine Using Crankshaft Speed Fluctuations, P. Azzoni and G. Cantoni (ENEA), G. Minelli and D. Moro (Universitá di Bologna), Giorgio Rizzoni (The Ohio State Univ.), M. Ceccarani and S. Mazzetti (Lamborghini Automobili) (SAE Paper No. 950837).

The Effect of Engine Misfire on Exhaust Emission Levels in Spark Ignition Engines, Ahmed Soliman, Giorgio Rizzoni, and Vasanth Krishnaswami, Ohio State University (SAE Paper No. 950480).

O = INDUCED MISFIRE
X = DETECTED MISFIRE

REAL TIME MISFIRE DETECTION FOR AUTOMOBILE ENGINES

BACKGROUND OF THE INVENTION

1. Technical Field

The present invention relates generally to internal combustion engines and, more particularly, to a method and apparatus for detecting automobile engine misfire based on digitally filtered high data rate crankshaft rpm and measurements of manifold absolute pressure.

2. Discussion

Government regulations require automobile manufacturers to control the exhaust of engine combustion byproducts such as hydrocarbons, carbon monoxide, and nitrous oxide. Emission of such byproducts is typically controlled through implementation of a catalytic converter which operates at a high temperature and, through the use of a catalyst, burns the aforementioned unwanted exhaust byproducts to reduce automobile emissions. By implementing catalytic converters into the exhaust systems of an automobile, automobile manufacturers are able to comply with government regulations in a cost-effective manner.

However, if an automobile engine misfires, an increased amount of unburned combustion byproducts is passed through the catalytic converter. Engine misfire occurs as a result of the absence of spark in a cylinder, poor fuel metering, poor compression, or other similar conditions. Over time, regular engine misfire can lead to damage of the catalyst in the catalytic converter and, consequently, increased amounts of unburned byproducts being admitted into the atmosphere.

As a result, regulatory agencies such as the California Air Resources Board (CARB) require that many motor vehicles with feedback fuel control systems be equipped with an emission malfunction indicator that identifies a misfiring engine and the particular malfunctioning component or components. Thus, upon the malfunction indicator being activated, the vehicle operator could proceed to a qualified vehicle repair center to have the malfunctioning component repaired or replaced before an excessive amount of exhaust byproducts is emitted into the air by the vehicle.

Typically, the above mentioned malfunction indicators generate data allowing identification of specific misfiring engine cylinders. In particular, the CARB rules, known as On-Board Diagnostics II guidelines, mandate that the automobile manufacturer specify a percentage of misfires out of the total number of firing events necessary for determining malfunction for: (1) the percent misfire evaluated in a fixed number of revolution increments for each engine speed and load condition which would result in catalyst damage; (2) the percent misfire evaluated in a certain number of revolution increments which would cause a motor vehicle to fail a federal test procedure by more than 1.5 times the CARB standard if the degree of misfire were present from the beginning of the test; and (3) the degree of misfire evaluated in a certain number of revolution increments which would cause a motor vehicle to fail inspection and a maintenance program tailpipe exhaust emission test. It is contemplated that similar rules are or may be implemented by other states as by the federal government in the foreseeable future.

Government regulations such as those mandated by CARB also require that automobile manufacturers be able to provide information identifying misfiring engine cylinders. This misfire information is typically collected and stored in a computer memory associated with the automobile engine and later downloaded at a service center and is used in diagnostic testing of the vehicle. One misfire detection and identification approach is disclosed in U.S. Pat. No. 5,361,629, issued Nov. 8, 1994 entitled "Single Sensor Misfire Detection Apparatus and Method for an Internal Combustion Engine" which is incorporated herein by reference. The misfire detection approach disclosed in the aforementioned patent senses crankshaft rotation and calculates a crankshaft velocity based on the sensed rotation. The calculated crankshaft velocity changes or a compensated velocity change is compared to a predetermined crankshaft velocity range to determine engine misfire.

Additional engine misfire detection approaches are disclosed in pending U.S. patent application Ser. No. 08/468,117 filed Jun. 6, 1995 for "Engine Misfire Detection with Compensation for Normal Acceleration of Crankshaft", now U.S. Pat. No. 5,574,217; U.S. patent application Ser. No. 08/469,040 filed Jun. 6, 1995 for "Engine Misfire Detection with Rough Road Inhibit", now U.S. Pat. No. 5,544,521; and U.S. patent application Ser. No. 08/468,113 filed Jun. 6, 1995 for "Engine Misfire Detection with Cascade Filter Configuration", now U.S. Pat. No. 5,602,231. The aforementioned applications are assigned to the assignee of the present application and are incorporated herein by reference. The approaches disclosed in the above mentioned patent applications relate to engine misfire detection including sorting of a plurality of changes in crankshaft angular velocity over a predetermined series of cylinder firings in averaging the two middle most angular velocity changes to provide an average change in velocity value. The deviation is determined between the change in angular velocity for a selected cylinder and the average change in velocity value. Misfires are detected as a function of a comparison of the deviation with a predetermined threshold velocity value.

Generally, a number of conventional misfire detection approaches work well at engine speeds below 4000 rpm. At these lower engine speeds, with cylinder identification engine misfire detection can be implemented through monitoring of engine rpm alone. Even at low engine speeds, however, transient signals caused by conditions such as powertrain bobble, engine noise, changing of gears, or engine acceleration and deceleration may cause false engine misfire detection. Additionally, at higher engine speeds of typically greater than 4,000 rpm, engine induced crankshaft flex, or torsional vibration, can cause false engine misfire detection.

To reduce the number of false engine misfire detections, the approach disclosed in pending U.S. application Ser. Nos. 08/511,125 filed Aug. 4, 1995 for "Engine Misfire Detection with Digital Filtering," now U.S. Pat. No. 5,633,456 also assigned to the assignee and incorporated herein by reference, was developed to filter out noise related signals at both low and high engine frequencies to achieve an enhanced signal to noise ratio for detecting engine cylinder misfires. A crankshaft velocity signal is generated by measuring the amount of time expired over a 40° crankshaft angular displacement interval for a cylinder expansion stroke. A digitally implemented high pass finite impulse response (FIR) filter is implemented at low engine speeds to filter out low frequency engine noise. At high engine speeds, a low pass FIR filter is implemented to filter out high frequency engine noise from the crankshaft rotation signal.

In addition, many conventional misfire detection approaches analyze engine firing frequency through a fast fourier transform (FFT) or other similar frequency domain-based analysis to determine whether an engine misfire has occurred for a particular cylinder firing event. However, the aforementioned approaches are typically complex in implementation and do not take into account manifold absolute pressure (MAP) in setting a particular threshold value for engine misfire detection.

Further, many conventional misfire detection methods utilize low data rate sampling of engine crankshaft velocity or acceleration. With low data rate sampling, higher multiples of the engine firing frequency, which often contain valuable misfire information for higher engine speeds, frequently are folded back, or aliased, into lower noise-related engine frequencies. These aliased signals are thus either filtered out completely from the misfire detection signal or cause misinterpretation of cylinder firing event data.

While the above described approaches represent generally effective engine misfire detection techniques, there is room for improvement in the art. In particular, there is a need for a misfire detection technique that can identify multiple engine misfires through evaluation of engine speed and average MAP data alone, without the need for implementation of complex frequency-based methods of analysis, such as Fast Fourier transform-based methods, or the need for additional engine system data such as engine temperature or throttle feedback data. Also, there is a need for an engine misfire detection method in which one of a multiple of FIR filter banks is implemented over a predetermined range of engine speeds to provide effective removal of noise related signals from the signal representing crankshaft angular velocity. There is also a need for an engine misfire detection technique that samples crankshaft angular velocity at a high data rate so that change in crankshaft angular velocity over a given band of engine frequencies around the engine firing frequency may be determined to produce more accurate engine misfire calculations. In addition, there is a need for an engine misfire detection technique that utilizes MAP data to set a particular signal threshold for a given set sampled crankshaft angular velocities.

SUMMARY OF THE INVENTION

According to a first embodiment of the present invention, an apparatus for detecting misfires of a motor vehicle internal combustion engine is provided. The apparatus includes a speed sensor for generating a signal. Also, the apparatus includes a filter means for filtering noise-related events from the signal corresponding to sensed engine speed to thereby produce a filtered output signal. In addition, a pressure sensor measures average manifold absolute pressure over a cylinder firing event to set a misfire threshold change in engine speed value. Comparison means compares the filtered output signal with the threshold change in engine speed value to detect an engine misfire condition for the cylinder firing event.

According to a second embodiment of the present invention, a method of detecting misfiring of an internal combustion engine is provided. The method includes the step of sampling crankshaft angular velocity for a plurality of cylinder firing events to generate a crankshaft angular velocity signal. Also, the method provides for digitally filtering the crankshaft angular velocity signal to provide a filtered crankshaft angular velocity output signal. The method also provides for comparing said filtered crankshaft angular velocity signal for two cylinder detected firings. The method then determines whether a cylinder misfire has occurred by comparing the difference in said crankshaft angular velocity signal to a crankshaft angular velocity threshold value.

DETAILED DESCRIPTION OF THE DRAWINGS

DETAILED DESCRIPTION OF THE PREFERRED EMBODIMENT

Figure 1:
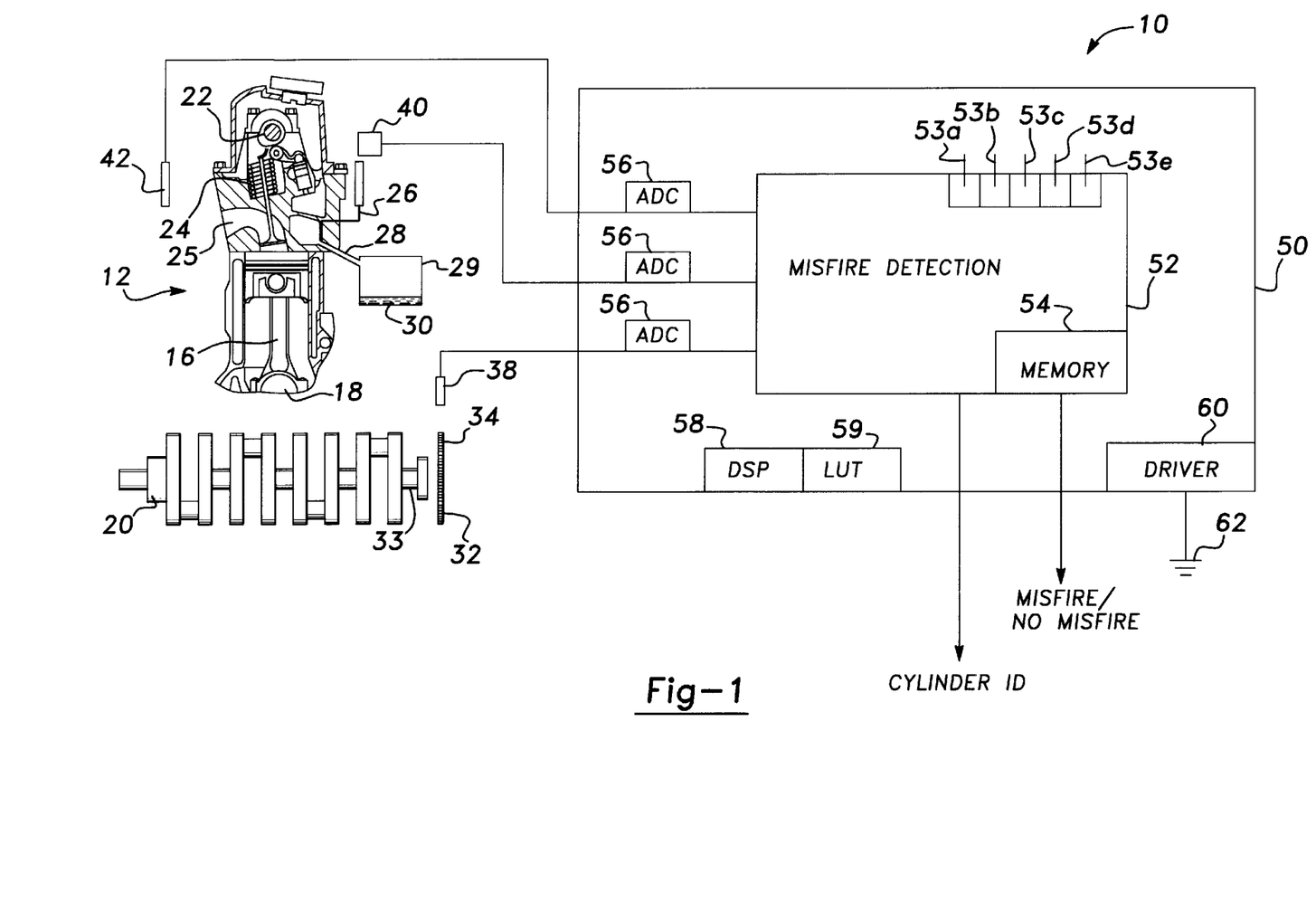
FIG. 1 illustrates a side elevational view of a spark-ignited internal combustion motor vehicle engine in cross-section, a crankshaft associated with the engine, and a block diagram of a motor vehicle electronic control unit in which the spark advance control of the present invention is implemented.

Referring now to the drawing figures, a block diagram of the engine system, in which the misfire detection system of the present invention is implemented, is shown generally at 10. The system 10 includes an internal combustion spark ignited engine 12, shown in partial cross-section, which is of the type implemented in a conventional motor vehicle (not shown). The engine contains a plurality of cylinders, represented by the cylinder 14, with each of the cylinders having a piston, represented by the piston 16, operatively disposed therein. Each of the pistons is connected by a connecting rod 18 to a crankshaft 20. A conventional engine cam shaft 22 is also operatively located within the engine for opening and closing an intake valve or valves, such as the valve 24, associated with the cylinder 14 for supplying a fuel/air mixture to the cylinders in a manner well known in the art during the piston intake. A manifold 25 is also operatively associated with the intake valve 24 for supplying air from outside of the engine into the cylinder 14 to provide air for the valve fuel/air mixture supplied to the cylinder.

The engine 12 is a conventional four-cylinder, four-stroke engine having an intake stroke in which fuel and air mixture is input into the cylinder 14 through the intake valve 24, a compression stroke in which the fuel/air mixture is compressed by the piston 16, an expansion stroke in which a spark supplied by a spark plug 26 ignites the fuel/air mixture, and an exhaust stroke during which gases from the burned fuel are exhausted from the cylinder through an exhaust system 28, including a catalytic converter 29 having an associated catalyst 30. Although the preferred embodiment of the present invention is implemented in a four cylinder, four-stroke engine such as that shown at 12, it should be appreciated that the present invention may be implemented in any conventional engine system, including a two-stroke engine system, or any spark ignited or diesel engine system.

Figure 2:
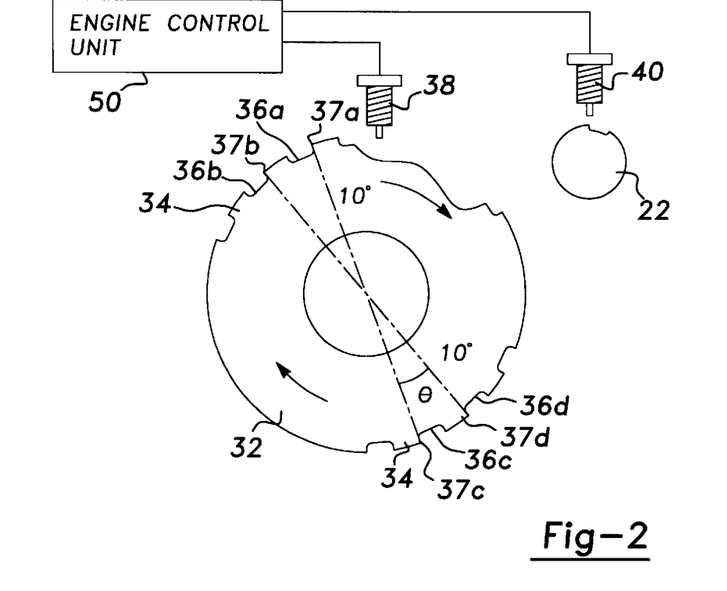
FIG. 2 is an enlarged front view of the crankshaft sensor wheel and crankshaft sensor shown in FIG. 1.

Still referring to FIG. 1, a crankshaft sensor wheel 32 is operatively fastened to a sensor wheel mount nose 33 by screws or other similar fastening devices. The sensor wheel mount nose is in turn welded or otherwise operatively connected to the crankshaft by spot welding or any other similar technique. Referring to FIG. 2, the crankshaft sensor wheel 32 includes a plurality of teeth 34 defining slots 36 therebetween. The slots 36 operate as crankshaft angular velocity sensing points for measuring the angular velocity of the crankshaft, and thus the engine speed. It should be understood that the terms engine speed and crankshaft angular velocity are directly proportional to one another and may be used interchangeably throughout the specification.

Referring again to FIG. 2, it should be appreciated that the engine cylinders 14 are oriented in a conventional straight-line configuration. As a result, each cylinder has a 180° expansion stroke with a cylinder firing order of 1-3-4-2. Angular velocity measurements for the crankshaft 20 are measured by determining the time period for crankshaft angular displacement Θ for preferably a 10° expansion stroke interval for each of the four cylinders before the piston reaches top dead center (TDC) at the end of the expansion stroke. This 10° interval is preferably near the end of the piston expansion stroke. By measuring the time period for each 10° angular displacement of the crankshaft, a high data rate (HDR) sampling of the crankshaft is achieved.

More specifically, a slot 36a is formed in the crankshaft wheel 32 at a position corresponding preferably to a piston position of about 19° before top dead center (TDC) in the piston expansion stroke. At least one slot 36b is formed in the sensor wheel 32 adjacent the slot 36a and preferably at a position corresponding to a piston location at 9° before TDC. However, it should be appreciated that other slots may be formed in the crankshaft sensor between the slots 36a, 36b to initiate ignition timing control or for other timing purposes. First and second edges 37a, 37b are associated with the first and second slots 36a, 36b. The first edge corresponds to the initiation of crankshaft angular velocity measurements for cylinder numbers 1 and 4 in the four cylinder engine arrangement, while the second edge corresponds to the termination of these measurements. Additionally, two other slots 36c, 36d are formed in the crankshaft sensor wheel 32 to form third and fourth edges 37c, 37d oriented 180° apart on the crankshaft sensor wheel from the slot edges 37a, 37b.

The system 10 also includes a crankshaft sensor 38 in communication with the sensor wheel 32, and a cam position sensor 40 in communication with the cam shaft 22. Both the crankshaft sensor 38 and the cam shaft sensor 40 generate signals used by the misfire detection system of the present invention in a manner discussed in detail below. The crankshaft sensor 38 measures time elapsed between rotation of slot edges 37a, 37b, and subsequently edges 37c, 37d and other corresponding pairs of slot edges past the crankshaft sensor 38. The sensor crankshaft subsequently generates an analog signal corresponding to this rotation time period that is utilized in determining crankshaft angular velocity, and thus engine speed, as will be described in detail below.

The cam shaft sensor 40 is utilized for identification of specific cylinder firing events and is implemented based on the fact that the cam shaft 22 rotates 360° for every 720° of rotation of the crankshaft 20. Cylinder firing event identification enables the misfire detection system of the present invention to calculate which cylinder or cylinders are misfiring. The engine system 10 preferably uses a stock cam sensor and associated cylinder identification technique to determine the TDC of the number 1 cylinder. However, other cylinder identification techniques may be implemented according to the specific engine system.

The system 10 additionally includes a manifold absolute pressure (MAP) sensor 42 for measuring fluctuations in the air pressure in the manifold 25. Additional engine system components and sensors are not shown, as such components and sensors are conventionally implemented and are well known to those skilled in the art. It should be appreciated at this point that the crankshaft sensor 38, the cam shaft sensor 40, and the MAP sensor 42 may be Hall effect sensors, optical sensors, variable reluctance sensors, or any other type of sensors well known in the art. Each of the sensors 38, 40 and 42 generate an analog signal representative of the sensed condition and communicates this analog signal to an electronic control unit (ECU) 50 which is implemented along with other control circuitry (not shown) within the motor vehicle.

The ECU 50 includes a micro-controller 52 having an associated memory 54 and analog to digital converters 56 for converting analog signals from the sensors 38, 40, 42 to digital signals. The memory 54 is a memory of the type well known in the art, such as random access memory (RAM), read-only memory (ROM), or any other similar type of conventional computer memory. A digital signal processor 58, also implemented at the ECU 50, processes outputs from the analog to digital converters 56 to condition the signals from the sensors 38, 40, 42 for use in the misfire detection system of the present invention. Additionally, a look-up table 59 is implemented in the ECU 50 for starting MAP-dependent change in engine speed threshold values for use in the misfire detection pattern recognition methodology of the present invention described below. The ECU 50 also includes a lamp driver 60 which, upon the appropriate output signal being generated by the micro-controller 52, drives an output display such as a driver warning light 62. The electronic control unit further includes additional timers, counters and like components of the type typically associated with a conventional micro-controller and which are used to implement the present invention.

Still referring to the ECU 50, the micro-controller 52 is configured to implement a plurality of finite impulse response (FIR) digital filters 53a–53c. The FIR digital filters are preferably designed as X order filters including X+1 filter coefficients.

In the present invention, filter 53a has 24 coefficients and filters 53b–53e have 8 coefficients. These filters are implemented presently in the spatial domain as a sum of products of individual filter coefficients $c_0$–$c_7$ with eight sequential samples of crankshaft angular velocity. By forming $$fv_k = \sum_{i=0}^{7} c_i v_{k+i}, k = 0, \ldots,$$

where $v=[v_k, k=0\ldots]$ is the sampled crankshaft angular velocity. After choosing the frequency band for misfire detection in each speed range, filter design routines, commonly available in Matlab and other digital signal processing software packages, can generate the coefficients $c=[c_0, \ldots, c_7]$ which are used in the digital filters.

The filter coefficients are preferably predetermined and programmed into the micro-controller memory 54. Preferably, a high pass FIR filter 53a is implemented on a full-time basis to filter out low frequency transients, which typically occur at frequencies below approximately one-quarter of the engine firing frequency and are caused by engine noise, or engine acceleration and deceleration.

Additionally, band pass FIR filters 53b–53e are each selectively activated over a particular range of engine speeds to filter high frequency noise related signals from the crankshaft angular velocity signals caused by such phenomena as the inherent flexing, or torsional vibration, of the crankshaft 20. The FIR filters 53a–53e thereby enhance the signature of the signal generated by the crankshaft sensor. Preferably, the filters 53b–53e are implemented over the following engine speed ranges:

(1) idle to 3000 rpm
(2) 3000 to 4500 rpm
(3) 4500 to 5500 rpm
(4) 5500 rpm to redline.

However, this method could use a different number of filters, or, different speed ranges.

While FIR digital filters are shown and described as being implemented with the present invention, it should also be appreciated that other digital filters, such as infinite impulse response filters, could alternately be implemented in the present invention. In particular, the filters are of the type disclosed in pending U.S. patent application Ser. No. 08/695,766, filed Aug. 1, 1996 for "Spatial Frequency Implemented Digital Filter Bank Implemented for Engine Misfire Detection". The aforementioned pending patent application is assigned to the assignee of the present invention and incorporated herein by reference.

Figure 3:
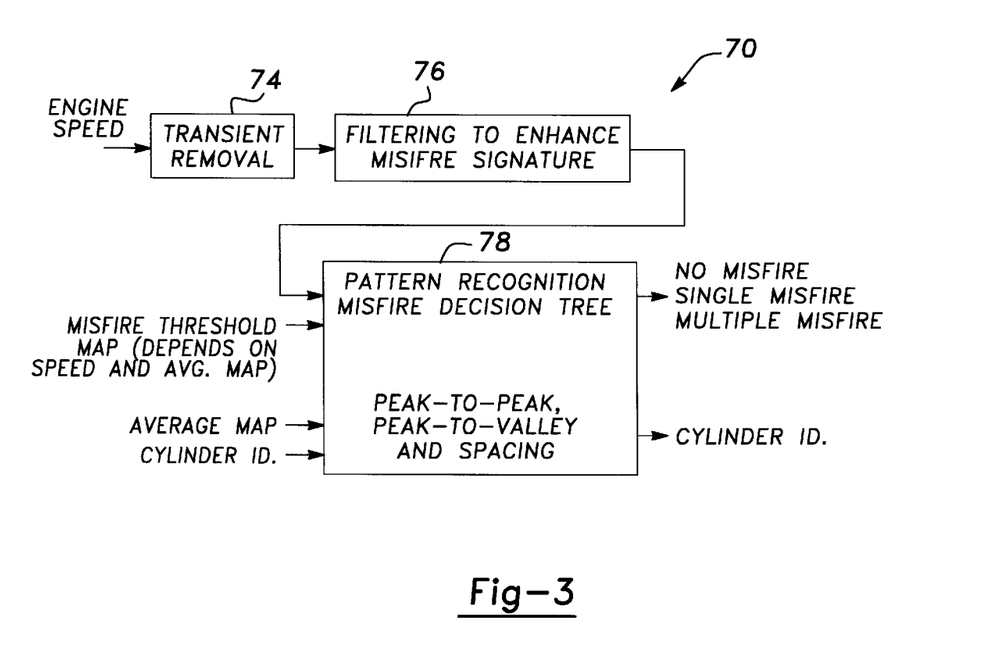
FIG. 3 is an overall system block diagram of the misfire detection system according to a preferred embodiment of the present invention.

Referring to FIG. 3, a block diagram illustrating the implementation of the engine misfire detection system of the present invention is shown generally at 70. Engine speed, which is measured as crankshaft angular velocity by the crankshaft sensor 38, subsequent to being conditioned through the analog to digital converters 56 and the digital signal processor 58, is input into the high pass FIR filter 53a for removal of transient signals, as is indicated at block 74. Subsequently, as indicated at block 76, the crankshaft angular velocity signal is input into one of the FIR digital band pass filters 53b–53e, each of which is activated according to a particular range of engine speeds programmed into the memory 54, to remove high frequency noise-related signals such as torsional vibration to enhance the signature of the signal. At block 78, the crankshaft sensor signal, along with a threshold lookup table which depends on engine speed and MAP, an average MAP signal, and a cylinder identification signal generated by the camshaft sensor 40 are input into a pattern recognition misfire decision tree implemented in accordance with the present invention to determine the occurrence of no engine misfire, a single engine misfire, or multiple engine misfires. The signature of the crankshaft velocity signal is thus greatly improved, and only the signal corresponding to a particular band of engine speed frequencies, including the firing frequency and multiples thereof, preferably up to and including signals corresponding to four times the engine firing frequency, are passed from the digital band pass filters 55b–55e to the pattern misfire signature methodology of the present invention for engine misfire detection purposes, as will now be described in detail below.

Figure 4:
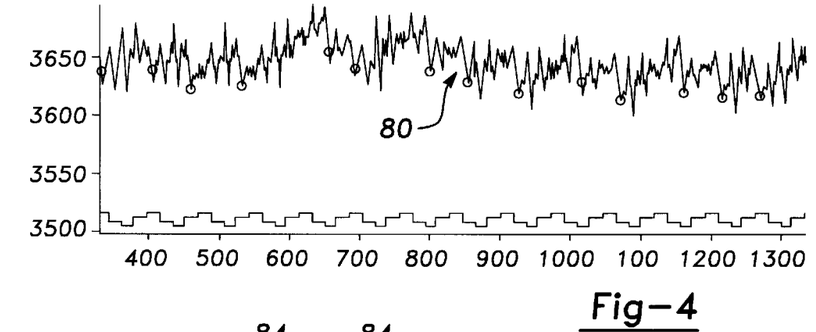
FIG. 4 graphically illustrates a sensed non-filtered engine speed signal generated over a number of crankshaft angular velocity samples at a first engine speed and average MAP pressure.
Figure 5:
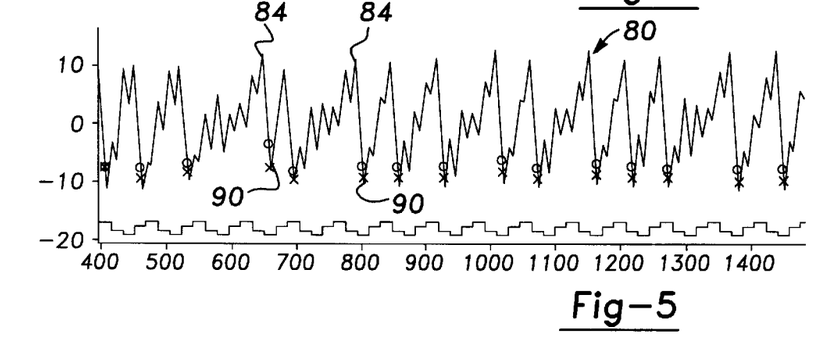
FIG. 5 represents the engine speed signal of FIG. 4 subsequent to digital filtering of the signals by the digital filtering bank of the present invention.

Referring to FIGS. 4 and 5, an engine speed signal is shown for the four cylinder, four-stroke, two cycle engine, at a speed of 1350 rpm and MAP pressure of 400 Torr for a plurality of 10° samples taken over numerous cylinder firing events. In FIG. 4, the engine speed signal 80 is shown in an unfiltered state and prior to filtering by the filters 53a–53e. In FIG. 5, the signal 80 is shown subsequent to filtering by the digital FIR filters 53a–53e over the same sampling period plotted in FIG. 5.

Figure 6:
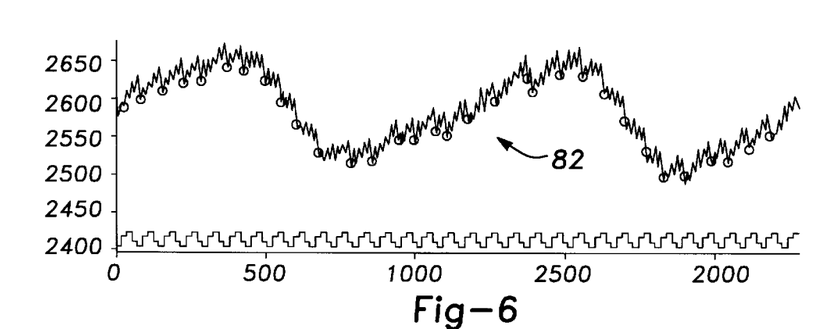
FIG. 6 illustrates a sensed non-filtered engine speed signal generated over a number of crankshaft angular velocity samples over a number of samples at a second given engine speed and average MAP pressure.
Figure 7:
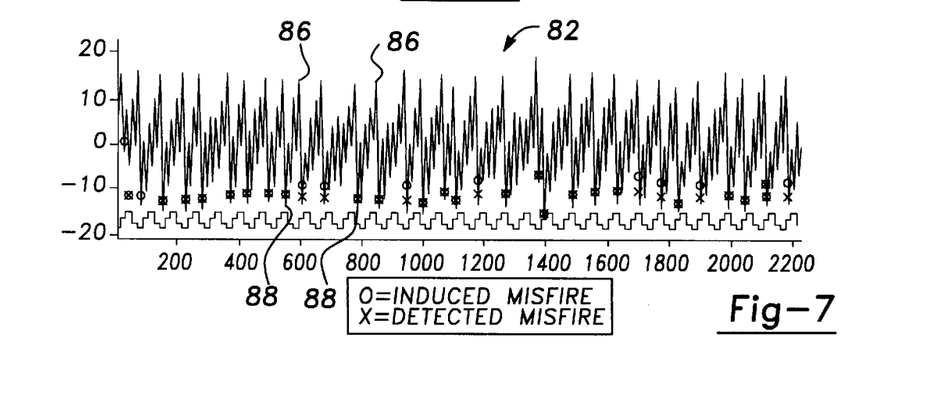
FIG. 7 illustrates the signal of FIG. 6 subsequent to digital filtering of the samples by the digital filtering bank of the present invention.

Similarly, FIG. 6 shows an unfiltered engine speed signal 82 for the engine 12 at a speed of 2500 rpm and at a MAP pressure of 200 Torr over a plurality of 10° samples for numerous cylinder firing events. FIG. 7 shows the signal 82 after the signal has been filtered by the digital FIR filters 53a–53e.

As is evident, the digital filters implemented in the present invention greatly enhance the detection of successive cylinder firing events, represented by peaks such as those at 84 and 86 in the graphs shown in FIGS. 5 and 7, and of the subsequent minimum engine speeds such as those at 88 and 90 signalling possible engine misfire. The filters thereby enhance the accuracy of the engine misfire detection system of the present invention, in a manner which will now be described in detail.

Figure 8:
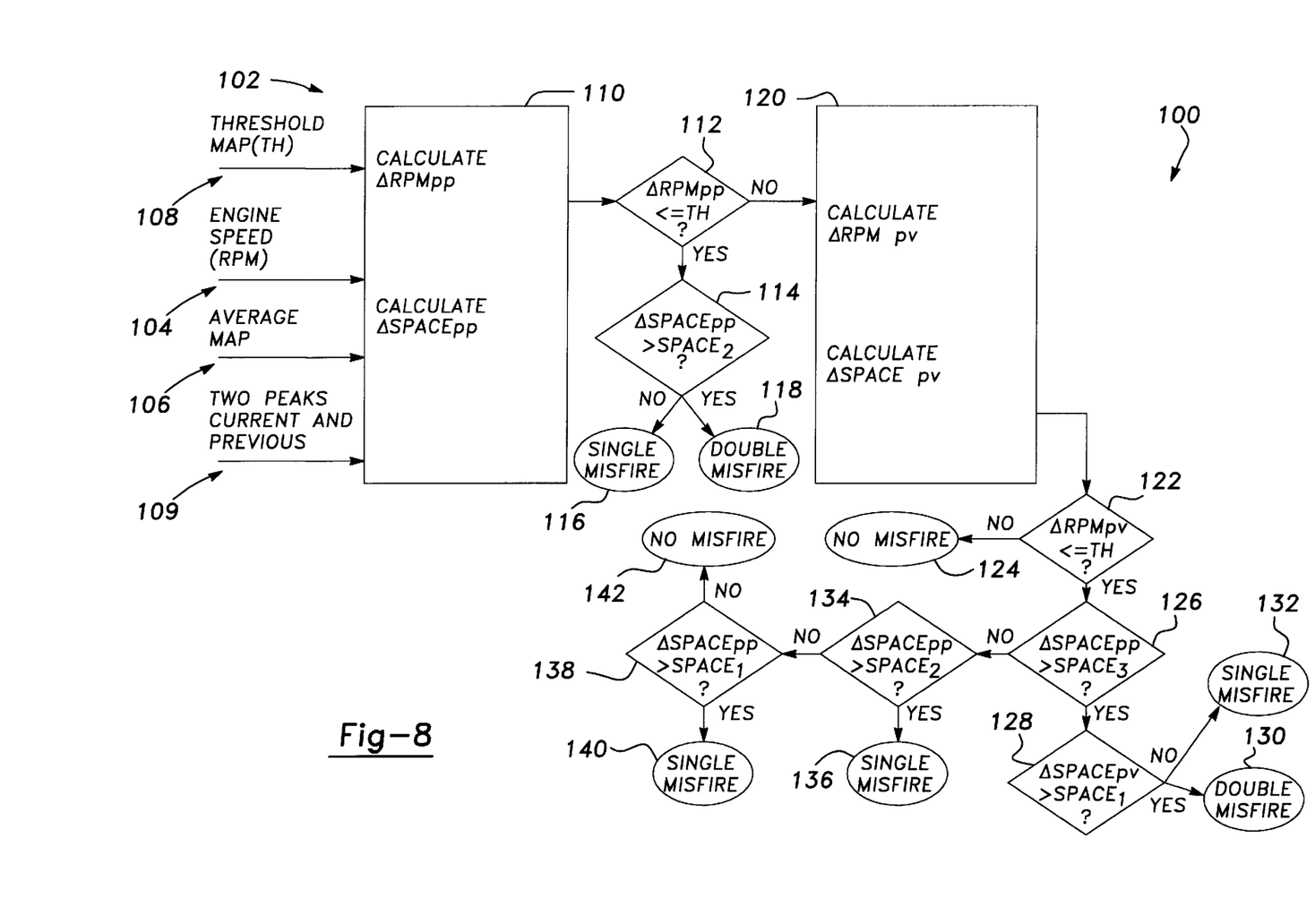
FIG. 8 illustrates a flow diagram of the pattern recognition logic implemented by the misfire detection system of the present invention.
Figure 9:
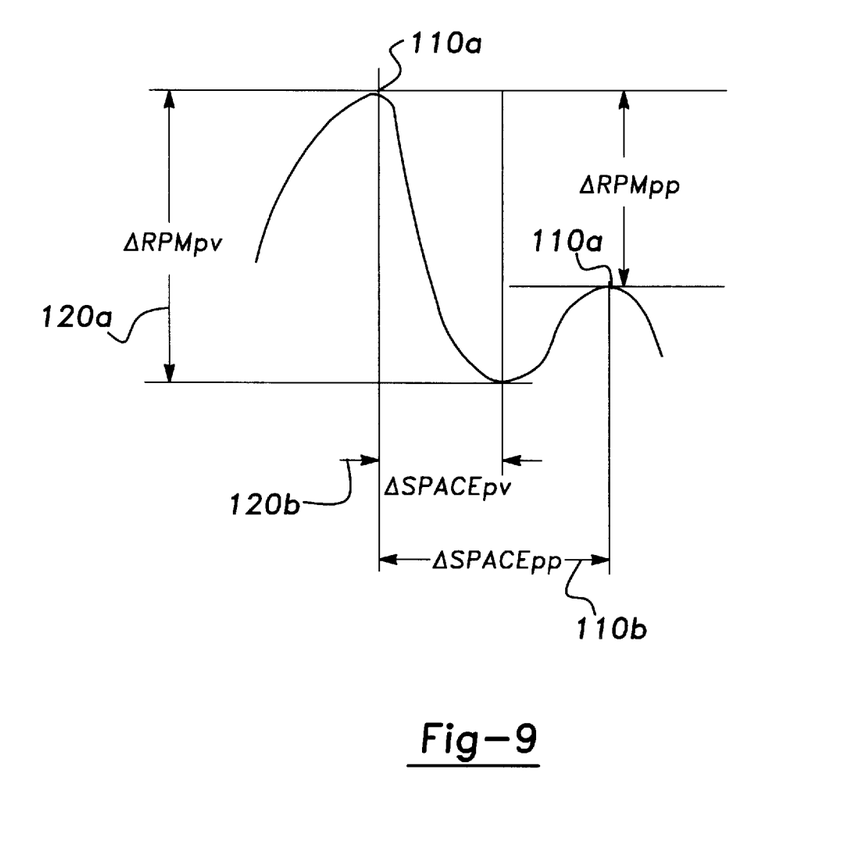
FIG. 9 illustrates an isolated view of the engine misfire signal of FIG. 7.

Referring to FIGS. 8, 9 and 10, the engine misfire detection methodology as implemented according to the present invention is shown generally at 100. At step 102, four signals are input into the misfire detection method of the present invention. Engine speed for a plurality of cylinder firing events is input as generally shown at 104. Second, an average MAP value is input as shown generally at 106. This average MAP value is represented by a DC voltage level and is taken from two MAP values measured during an individual cylinder firing event. Third, a threshold value (TH) is input as shown generally at 108 and is utilized by the present invention in a manner discussed below. This threshold value is dependent upon the engine speed and average MAP value. Threshold values for varying engine speeds and average MAP are programmed into the look-up table 59 implemented in the controller 52. Fourth, engine speed values corresponding to the detected engine speed value at the current cylinder firing determined by the current peak and the previous engine speed sampled at a previous cylinder firing determined by the previous peak are input as indicated generally at 109. Usually, the two cylinder firings, which are compared, occur sequentially. When the compared cylinder firings are not sequential, misfires have usually occurred between two normal cylinder firings.

The cylinder firings to compare are selected by analyzing the filter crankshaft angular velocity. Peaks are found by comparing the current sample to all samples within two or three samples provided that current sample is greater than or equal to it. If a peak is not found, the next sample is analyzed for a peak value. Otherwise, if a peak is found, the next sample to be analyzed is the current one, plus about five samples. Two sequential peaks determine the cylinder firings to be compared. Normally, if there is no misfiring, a peak is detected during each cylinder firing.

At step 110, $\Delta \text{RPM}_{pp}$, the difference in engine speed between the compared engine cylinder firings, as represented by the peaks at 110a in FIG. 9, is calculated from the input signals 108. Additionally, the number of samples between the two above mentioned peaks, or $\Delta \text{SPACE}_{pp}$, shown generally at 110b in FIG. 10, is calculated at 110.

At step 112, $\Delta \text{RPM}_{pp}$ is compared to the threshold value TH stored in the look-up table 59 for the particular engine speed. If $\Delta \text{RPM}_{pp}$ is less than or equal to TH, the method of the present invention determines that a misfire has occurred. Subsequently, at step 114, $\Delta \text{SPACE}_{pp}$ is compared to $\text{SPACE}_2$, which has a value programmed into the memory 54 corresponding to the number of samples for two consecutive cylinder firing events plus a fixed space factor to compensate for noise. If $\Delta \text{SPACE}_{pp}$ is not greater than $\text{SPACE}_2$, then the method determines at step 116 that only a single engine misfire has occurred. If $\Delta \text{SPACE}_{pp}$ is greater than $\text{SPACE}_2$, then the method determines at step 118 that a double engine misfire has occurred.

Returning to step 112, if the methodology determines that $\Delta \text{RPM}_{pp}$ is not less than or equal to TH, then additional pattern recognition steps are utilized. At step 120, the methodology subsequently determines the minimum engine speed change associated with a particular sample between the currently detected cylinder firing and the previous detected cylinder firing. The methodology then calculates the $\Delta$ $RPM_{pv}$, shown at 120a in FIG. 9, which is the difference in engine speed between the engine speed measured at the previous cylinder firing and the minimum engine speed measured subsequent to the previous cylinder firing. Additionally, $\Delta$ $SPACE_{pv}$, shown at 120b in FIG. 9, is calculated. $\Delta$ $SPACE_{pv}$ represents the number of samples between the engine speed measured at the previous cylinder firing determined by the first peak and the minimum engine speed measured subsequent to the previous cylinder firing.

Subsequent to $\Delta$ $RPM_{pv}$ and $\Delta$ $SPACE_{pv}$ being calculated, the methodology determines if $\Delta$ $RPM_{pv}$ is less than or equal to TH at step 122. If $\Delta$ $RPM_{pv}$ is not less than or equal to TH, the methodology determines that no misfire has occurred at step 124. However, if it is determined that $\Delta$ $RPM_{pv}$ is less than or equal to TH, the methodology advances to step 126 to determine if $\Delta$ $SPACE_{pp}$ is greater than $SPACE_3$, where $SPACE_3$ represents the number of samples over three cylinder firing events (54 for a four cylinder engine) plus a fixed space factor which compensates for engine noise and which is programmed into the memory 54. As with the fixed space factor for $SPACE_2$, the fixed space factor $SPACE_3$ is dependent upon the type of engine in which the present invention is implemented and thus may be changed in accordance with well known software programming procedures. If $\Delta$ $SPACE_{pp}$ is greater than $SPACE_3$, the method advances to step 128 to determine if $\Delta$ $SPACE_{pv}$ is greater than $SPACE_1$, where $SPACE_1$ represents the number of samples over a single cylinder firing event plus a noise compensation factor. If $\Delta$ $SPACE_{pv}$ is greater than $SPACE_1$, the methodology determines at step 130 that a double misfire has occurred. If $\Delta$ $SPACE_{pv}$ is not greater than $SPACE_1$, the methodology determines at step 132 that only a single misfire has occurred.

Returning to step 126, if the methodology determines that $\Delta$ $SPACE_{pp}$ is greater than $SPACE_3$, the methodology advances to step 134 rather than to step 128. At step 134, the methodology determines if $\Delta$ $SPACE_{pp}$ is greater than $SPACE_2$. If $\Delta$ $SPACE_{pp}$ is greater than $SPACE_2$, the methodology determines at step 136 that only a single misfire has occurred. If $\Delta$ $SPACE_{pp}$ is not greater than $SPACE_2$, the method advances to step 136 to determine if $\Delta$ $SPACE_{pp}$ is greater than $SPACE_1$. If $\Delta$ $SPACE_{pp}$ is greater than $SPACE_1$, the methodology determines at step 140 that a single misfire has occurred. If $\Delta$ $SPACE_{pp}$ is not greater than $SPACE_1$, the methodology determines at step 142 that no misfire has occurred. The methodology then returns to step 110 and receives data relating to subsequent detected cylinder firing events to determine if no misfires, a single misfire, or a double misfire has occurred.

Upon detection of an engine misfire or misfires, the controller 52 generates a misfire signal along with a cylinder identification signal based on information from the camshaft sensor 34. The engine misfire and cylinder identification information is stored in the memory 54 and may be retrieved and utilized for engine diagnostic purposes. Additionally, the engine misfire data may be utilized by the micro-controller 52 to determine whether a given rate of misfire will cause premature failure of the catalyst 29. If the micro-controller determines that the catalyst has failed or will fail, the micro-controller 52 enables the lamp driver 60 to illuminate the driver warning lamp 62.

It should be appreciated that while methodology for detecting up to two misfires is disclosed in accordance with the preferred embodiment of the present invention, minor programming changes may be made to the methodology of the present invention to extend the pattern recognition for three or more successive misfire events for detection of three or more successive misfires. In addition, it should also be appreciated that although the threshold map TH is disclosed as being implemented for both $\Delta$ $RPM_{pp}$ and to $\Delta$ $RPM_{pv}$, different maps TH1 and TH2 could be implemented separately for each of $\Delta$ $RPM_{pp}$ and $\Delta$ $RPM_{pv}$ for misfire detection without significantly altering the methodology of the present invention.

From the foregoing description, it should be appreciated that the engine misfire detection system of the present invention, through a combination of high data rate crankshaft angular velocity sampling, digital filtering, and engine misfire pattern recognition implemented through evaluation of average MAP and engine speed data, provides a highly accurate way of detecting zero, single or multiple engine misfire occurrences. The high data rate sampling of crankshaft angular velocity prevents aliasing of signals at the higher multiples of engine speed firing frequency and thus subsequent removal of these higher frequency signals from the crankshaft angular velocity signal prior to the engine misfire detection methodology evaluating the signal. In addition, the engine misfire detection methodology of the present invention is capable of determining multiple engine misfires based on average MAP pressure and crankshaft angular velocity data alone, without the need for implementation of complex frequency analysis methods and without the need for additional engine system data. Thus, the engine misfire detection system of the present invention facilitates auto manufacturer compliance with government regulations, such as those mandated by CARB, with minimal subsequent reconfiguring of the engine control system.

While the above detailed description describes the preferred embodiment of the present invention, the invention is susceptible to modification, variation and alteration without deviating from the scope and fair meaning of the subjoined claims.

What is claimed is:

1. An apparatus for detecting misfires of a motor vehicle internal combustion engine, comprising:

a speed sensor for generating a crankshaft angular velocity signal a corresponding to sensed engine speed over a plurality of samples per cylinder firing event;

filter means for filtering noise-related events from said signal corresponding to sensed engine speed to thereby produce a filtered output signal corresponding to crankshaft incremental velocity change at a band of frequencies centered around an engine firing frequency;

a pressure sensor for measuring average manifold absolute pressure over a cylinder firing event that, in combination with engine speed, is used to select a programmed misfire threshold change in engine speed value; and comparison means for comparing said filtered output signal with said threshold change in engine speed value, that determines the presence of engine misfire based upon a detection of multiple drops in engine speed during a cylinder firing event, and that determines which, if any, of the drops correspond to engine misfire conditions.

2. The apparatus of claim 1, further comprising a look-up table implemented at said comparison means to provide said threshold value to said comparison means, said threshold value being dependent on said engine speed.

3. The apparatus of claim 1, wherein said speed sensor means comprises a crankshaft sensor for sampling crankshaft angular velocity.

4. The apparatus of claim 3, wherein said crankshaft sensor provides high data rate sampling of said crankshaft angular velocity.

5. The apparatus of claim 1, wherein said filter means comprises a first filter for filtering low frequency noise-related events from said signal corresponding to sensed engine speed and a second filter for filtering high frequency noise-related events from said signal corresponding to sensed engine speed.

6. The apparatus of claim 5, wherein said second filter comprises a plurality of digital filters each being activated over a predetermined range of engine speeds.

7. The apparatus of claim 1, wherein said comparison means compares differences in said output signal at points corresponding to detected peak determined cylinder firing events to determine said engine misfire condition.

8. The apparatus of claim 7, wherein said comparison means determines a number of cylinder sampling events between said detected cylinder firing events and compares said number of cylinder sampling events to a reference value for misfire detection.

9. The apparatus of claim 8, wherein said comparison means determines differences in said output signal between a cylinder firing event and a subsequent minimum engine speed following said cylinder firing event for misfire detection.

10. The apparatus of claim 9, wherein said comparison means determines the number of sampling events between said cylinder firing and said subsequent minimum engine speed and compares said number of sampling events to a reference value for misfire detection.

11. An engine system comprising:
   a spark ignited internal combustion motor vehicle engine;
   a crankshaft operatively connected to said engine for transferring torque created by said engine to motor vehicle wheels;
   a crankshaft sensor for generating a crankshaft angular velocity signal based on multiple samples of crankshaft angular velocity taken during each cylinder firing event, said crankshaft angular velocity corresponding to engine speed;
   filter means for filtering noise-related events from said crankshaft angular velocity signal to produce a filtered output signal including an engine firing frequency and multiples thereof;
   a pressure sensor for measuring average manifold absolute pressure over a predetermined range that, in combination with the engine speed, is utilized to select a stored misfire threshold value; and
   a comparator for comparing said filtered output signal with said misfire threshold value to detect an engine misfire condition over a predetermined number of cylinder firing events, said comparator being capable of detecting multiple drops in engine speed during a cylinder firing event and of determining which, if any, of the drops correspond to engine misfire conditions.

12. The system of claim 11, wherein said threshold value corresponds to a minimum allowable change in crankshaft angular velocity value and said comparison means compares change in said crankshaft angular velocity between at least two peak determined cylinder firing events to said threshold value.

13. The system of claim 12, wherein said comparison means determines a number of samples between said at least two peak determined cylinder firings and compares said number of samples to a first reference value for misfire detection if said change in crankshaft angular velocity is less than or equal to said threshold value.

14. The system of claim 12, wherein said comparison means calculates a difference in detected crankshaft angular velocity between a presently detected cylinder firing event and a subsequently detected minimum sampled crankshaft angular velocity and compares said difference to said misfire threshold value if said change in crankshaft angular velocity is greater than said threshold value.

15. The system of claim 14, wherein said comparison means determines a number of samples between said crankshaft angular velocity detected cylinder firing and said subsequent minimum crankshaft angular velocity and compares said number of samples to a second reference value for misfire detection if said difference in crankshaft angular velocity between said detected cylinder firing and said subsequent minimum crankshaft angular velocity is less than said threshold and said number of samples between said at least two detected peak determined cylinder firing events is greater than said first reference value.

16. The system of claim 11, wherein said comparator includes a look-up table for implementing a predetermined threshold value for a particular crankshaft angular velocity.

17. A method of detecting misfiring of an internal combustion engine, comprising the steps of:
   taking a plurality of samples of crankshaft angular velocity for each of a plurality of cylinder firing events to generate a crankshaft angular velocity signal;
   digitally filtering said crankshaft angular velocity signal to provide a filtered crankshaft angular velocity output signal at an engine firing frequency and multiples thereof;
   evaluating said filtered crankshaft angular velocity signal for multiple peaks of said signal detected during a cylinder firing event, to determine a crankshaft angular velocity difference signal between adjacent peaks; and
   determining whether cylinder misfires have occurred between said adjacent peaks by comparing said crankshaft angular velocity difference signal to a stored crankshaft angular velocity threshold value.

18. The method of claim 17, wherein said step of determining whether a cylinder misfire has occurred further comprises the steps of:
   measuring manifold absolute pressure over a predetermined time period to determine an average manifold absolute pressure; and
   setting said threshold crankshaft angular velocity value corresponding to said average manifold absolute pressure.

19. The method of claim 17, wherein said step of digitally filtering said crankshaft angular velocity signal comprises selectively switching to one of a plurality of crankshaft velocity dependent finite impulse response filters activated based on said crankshaft angular velocity.

20. The method of claim 17, wherein said step of sampling said crankshaft angular velocity signal comprises sampling said crankshaft angular for velocity every 10° of piston displacement in a cylinder firing event.

21. The method of claim 20, wherein said step of comparing said filtered crankshaft angular velocity signal comprises calculating the number of samples between said detected peak determined cylinder firing events and comparing said number of samples to a reference value if said difference in crankshaft angular velocity for detected peak determined cylinder firing events is less than said threshold value.

22. The method of claim 20, wherein said step of comparing said filtered crankshaft angular velocity signal comprises calculating change in said crankshaft angular velocity between a cylinder firing and a subsequent minimum detected crankshaft angular velocity and comparing said change in angular velocity to said threshold value if said difference in crankshaft angular velocity for detected cylinder firing events is less than said threshold value.

23. The method of claim 22, wherein said step of comparing said filtered crankshaft angular velocity signal comprises comparing said number of samples between said detected peak determined cylinder firing events to a first reference value for misfire detection if said calculated change in crankshaft angular velocity between said detected cylinder firing events and said subsequent detected minimum crankshaft angular velocity is less than said threshold value.

24. The method of claim 23, wherein said step of comparing said filtered crankshaft angular velocity signal comprises determining a number of samples between said detected cylinder firing event and said subsequent detected minimum crankshaft angular velocity and comparing said number of samples to a second reference value for misfire detection purposes if said number of samples between said detected peak determined cylinder firing events is greater than said first reference value.

\* \* \* \* \*